Jan. 12, 1965  G. N. MENASOFF  3,165,616

SEAM SEALING APPARATUS

Filed July 27, 1962  2 Sheets-Sheet 1

INVENTOR.
GEORGE N. MENASOFF
BY
*V. F. Volk*

HIS AGENT

Jan. 12, 1965 G. N. MENASOFF 3,165,616
SEAM SEALING APPARATUS
Filed July 27, 1962 2 Sheets-Sheet 2

INVENTOR.
GEORGE N. MENASOFF
BY U.F. Volk

HIS AGENT

SEAM SEALING APPARATUS
George N. Menasoff, Tarrytown, N.Y., assignor, by mesne assignments, to Anaconda Wire and Cable Company, a corporation of Delaware
Filed July 27, 1962, Ser. No. 212,806
6 Claims. (Cl. 219—60)

My invention relates to apparatus for sealing a seam in an advancing sheath.

In the manufacture of tubing or sheath from a flat ribbon or strip it is known to pass the strip through a series of dies or rollers that form it into a cylindrical shape with edges abutting each other, or in some methods, with the edges overlapping, and then sealing the edges together by welding or soldering. When this operation is performed continuously, in very long lengths, it is necessary to pass the edges of the cylinder, as it is formed, under a sealing apparatus such as a welding torch that is mounted at a fixed station. This has, however, created the problem, when there are stoppages or interruptions in the manufacturing process, that the long line of tubing has considerable inertia and cannot be stopped instantaneosuly, but continues past the torch for some distance before finally coming to a complete halt. The torch or other sealing equipment cannot continue operating during the deceleration of the sheath, however, for fear of overheating the edges of the strip. This problem is particularly severe in the case of cable sheathing where the sheath is formed around an electric cable core and the edges sealed with the core in place, for in this case the inertia of a heavy core is added to that of the sheath, making it even harder to come to a rapid stop. Also, in the operation of cable sheathing it is not feasible to reverse the operation for the purpose of pulling the unsealed tube back under the sealing means.

In the manufacture of sheathed cable where a metal sheath is continuously folded around a cable core and sealed by arc welding it has been suggested to mount the torch in such a manner that it can be moved forward when the operation stops until it reaches a position on the sheath which will avoid any gap in the weld. To understand the inadequancy of this suggestion it should be understood that the nature of the space between the edges of the strip will vary according to the position of the tube with relation to the aforementioned rollers or dies. The torch is necessarily adjusted for the heat required for a specific degree of edge contact, but if the torch is moved with relation to the rollers it will find itself at a point where the edge contact differs from what it is directly between the rollers with the result that an uneven or faulty weld will ensue.

Another shortcoming of the suggested apparatus wherein the torch can be translated relative to the other elements, is the fact that when a torch, such as an arc welding torch, is used as the sealing means, safety requires that the torch be covered by an enclosure. The walls of the enclosure will, however, be obstructed by the guide closing rolls thus severely limiting the distance the torch can be moved.

I have discovered that if the final pair of rollers ahead of the torch, the torch, and a pair of guide rollers downstream of the torch are all mounted on a platform that moves them as a unit, the torch will remain fixed relative to the rollers and the weld will be free from imperfections, even at points where the operation has been stopped in the middle of a run. My apparatus for forming a seam in an advancing sheath comprises a platform, means advancing and returning the platform a limited distance in the line of advance of the sheath, seam closing means such as a pair of rollers and seam sealing means such as an arc welding torch mounted on the platform and means for stopping the advance of the sheath within the distance of advance of the platform. My preferred means for advancing and returning the platform is a threaded shaft rotatably mounted at a fixed station adjacent to the platform and a nut fixed to the platform and threaded onto the shaft. Preferably the welding torch remains fixed relative to the rolls during the sealing operation and is applied to the sheath at a point between the rolls. I prefer also to mount on my platform an enclosure surrounding the rolls and the arc and having enrtance and exit apertures for the sheath.

A more thorough understanding of my invention can be gained from a study of the appended drawing.

Figure 3:
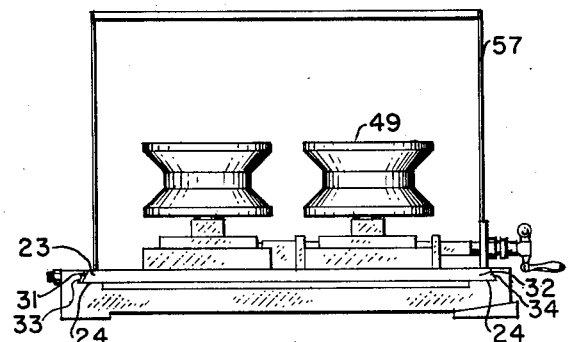
FIGURE 3 is a front elevation of the apparatus of FIGURE 1.
Figure 4:
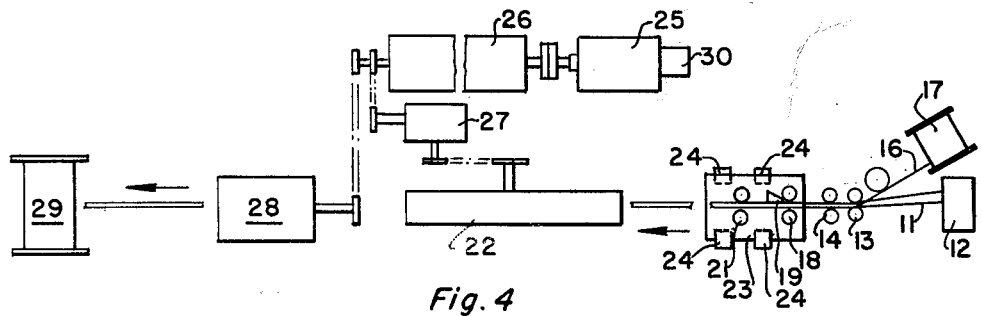
FIGURE 4 is a diagrammatic plan view of apparatus including the apparatus of FIGURE 1.

Referring to FIGURE 4 a metal strip 11 is fed from a roll 12, through a series of forming rolls 13, 14 at the same time that a cable core 16 is paid from a reel 17 and advanced above the strip 11 so that the rolls 13, 14 fold the strip around the core. The strip and core pass through an additional pair of rolls 18 which bring the edges of the strip together when they are welded by a torch 19 which has been omitted from FIGURES 1 and 3 for the sake of clarity. Thence the strip which is now in the form of a tube passes through guide rolls 21 urged by a caterpillar capstan 22. The rolls 18 and 21 and the torch 19 are mounted on a platform 23, hereinafter to be more fully described, that can slide on greased rails 24 for a limited distance. The capstan 22 is driven by a motor 25 having an electric brake 30 through a variable speed transmission 26 and gear box 27. When it is necessary to stop the advance of the strip 11 the brake 30 stops the motor 25 and thus the treads of the capstan 22 but the inertia of the strip 11 and core 16 is such that the apparatus does not actually stop until all the slack has been taken up in the gear train of the driving mechanism. When, for any reason, the brake 30 is applied the torch 19 is automatically extinguished by any of a number of well known switching means so that a certain length of unwelded strip advances past the torch. The length of the platform 23 is, however, selected long enough to permit the rolls 18 to advance to a point where the weld has been completed before the machine is restarted. From the capstan the welded tube may pass through additional apparatus such as a corrugating head 28 and thence to a take-up reel 29 driven by means not shown which is electrically linked to the motor 25 in a known manner to stop and start in synchronization therewith.

Figure 1:
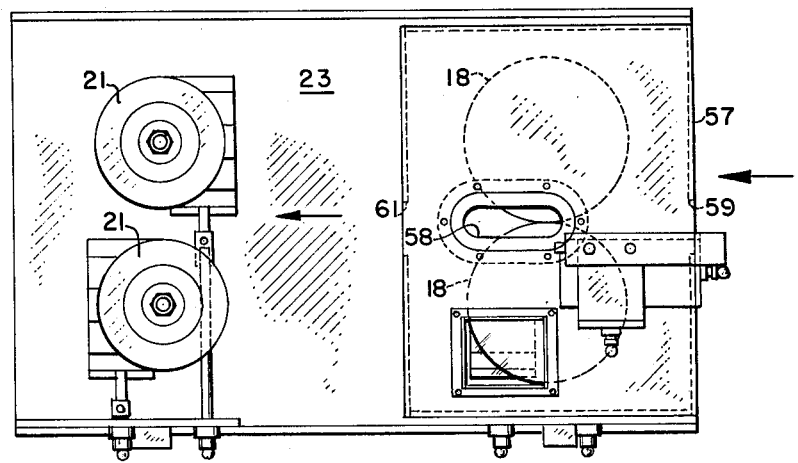
FIGURE 1 is a plan view of an apparatus of my invention.
Figure 2:
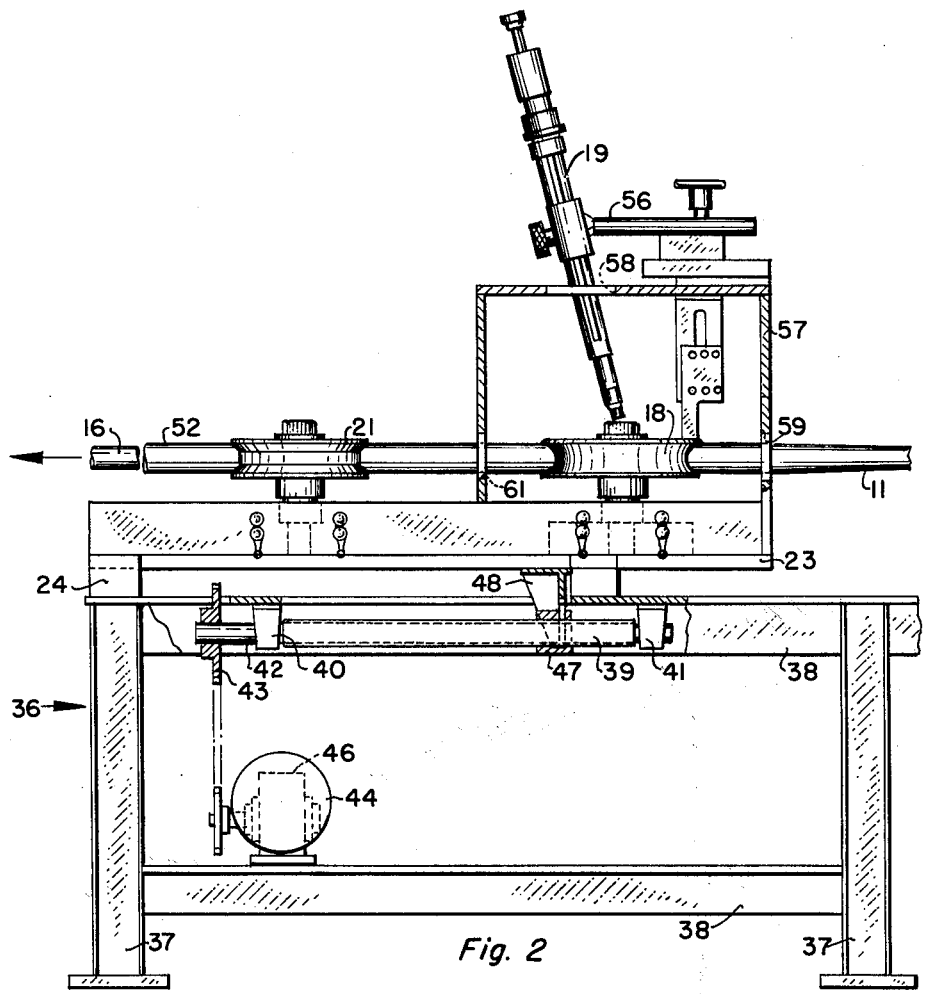
FIGURE 2 is a side elevation of the apparatus of FIGURE 1.

The platform 23 and apparatus mounted thereon is shown in detail in FIGURES 1, 2 and 3. Here (FIGURE 3) the platform 23 is seen to have beveled sides 31, 32 matching guide extensions 33, 34 of the rails 24 which prevent the platform from leaving the rails. As can best be seen in FIGURE 2 the apparatus is mounted on a frame 36 having upright members 37 and stringers 38. A threaded shaft 39 is mounted in bearings 40, 41 supported on one of the stringers 38. The shaft 39 has an unthreaded extension 42 to which is keyed a sprocket 43 which permits the shaft to be turned by means of a reversing motor 44 and reducing gear box 46. A nut 47 threaded on the shaft 39 is welded to a bracket 48 attached to the platform 23. Rotation of the shaft 39 will thus move the platform 23 forward until the nut 47 reaches the end of the shaft. In the event the motor 44 should remain on after the nut 47 has reached the bearing 40 a slip clutch of known type in the reducing gear box 46 prevents the motor from being overloaded. The pair of forming rolls 18 are mounted on the platform 23 so as to make the final bend in the strip 11 being formed into a tube 52 around the cable core 16. The torch 19 (FIGURE 2) is held by adjustable bracket 56 mounted on the platform 23. The torch 19 is so mounted that the welding arc will form at a location between the rolls 18 where the strip 11 is held firmly by the rolls. The lower portion of the torch 19 including the arc formed thereby and the rolls 18 are enclosed in a box or enclosure 57 which serves to protect the operator and the surrounding area from the welding arc formed by the torch 19. As is best seen in FIGURE 1 the enclosure 57 has a slot 58 for the passage of the torch 19. It also has an opening 59 for the entrance of the strip 11 and an opening 61 for the passage of the tube 52. Also mounted on the platform 23 are the pair of guide rolls 21 which align the tube 52 leaving the box 57.

When the advance of the tube 52 and core 16 is halted by the brake 30 the torch 19 immediately extinguishes its arc but the strip 11 advances a distance, usually no more than a few inches, after the torch has ceased to operate. When it is desired to continue the seam welding operation the motor 44 is started in a direction to advance the platform 23 until the rolls 18 have arrived to a point where the torch 19 is applied to a welded portion of the seam. The torch is then ignited and the motor 25 started to advance the tube 52. The motor 44 is then operated in such a manner as to move the platform 23 in a direction opposite to the advance of the strip 11. During the advance and return of the platform 23 the torch 19 does not alter its position relative to the rolls 18 and the weld is formed at a point where the strip is firmly gripped by the rolls.

I have invented a new and useful apparatus for sealing a seam in an advancing sheath for which I desire an award of Letters Patent.

I claim:

1. Apparatus forming a seam in an advancing sheath comprising:
   A. a platform,
   B. means advancing and returning said platform a limited distance in the line of advance of said sheath, and
   C. means for stopping the advance of said sheath within the distance of advance of said platform,
   D. said platform comprising, mounted thereon,
      (a) seam closing means and
      (b) seam sealing means.

2. Apparatus forming a seam in an advancing sheath comprising:
   A. a platform,
   B. means advancing and returning said platform a limited distance in the line of advance of said sheath, and
   C. means for stopping the advance of said sheath within the distance of advance of said platform,
   D. said platform comprising, mounted thereon,
      (a) a pair of rolls closing said seam and
      (b) means sealing said seam.

3. The apparatus of claim 2 wherein said sealing means is a welding torch.

4. Apparatus forming a seam in an advancing sheath comprising:
   A. a platform,
   B. means advancing and returning said platform a limited distance in the line of advance of said sheath, and
   C. means for stopping the advance of said sheath within the distance of advance of said platform,
   D. said platform comprising, mounted thereon:
      (a) a pair of rolls closing said seam,
      (b) a welding torch sealing said seam,
         (1) remaining fixed relative to said rolls during said sealing, and
         (2) being applied to said sheath at a point between said rolls.

5. Apparatus forming a seam in an advancing sheath comprising:
   A. a platform,
   B. a threaded shaft:
      (a) rotatably mounted at a fixed station
      (b) adjacent to said platform,
   C. a nut
      (a) fixed to said platform and
      (b) threaded onto said shaft,
   D. means for rotating said shaft so as to advance and return said platform,
   E. means for stopping the advance of said sheath within the length of said shaft,
   F. said platform comprising, mounted thereon:
      (a) seam closing means and
      (b) seam sealing means.

6. Apparatus forming a seam in an advancing sheath comprising:
   A. a platform,
   B. means advancing and returning said platform a limited distance in the line of advance of said sheath, and
   C. means for stopping the advance of said sheath within the distance of advance of said platform,
   D. said platform comprising, mounted thereon:
      (a) a pair of rolls closing said seam,
      (b) an arc welding torch sealing said seam,
      (c) an enclosure
         (1) surrounding said rolls and said arc, and
         (2) having entrance and exit apertures for said sheath.

References Cited in the file of this patent

Donelan, German application 1,118,728 printed December 7, 1961 (Kl. 76 7/01).